June 29, 1965     C. W. McCORNACK     3,191,989
CONVERTIBLE-TOP WINDOW STRUCTURE
Filed Feb. 4, 1963
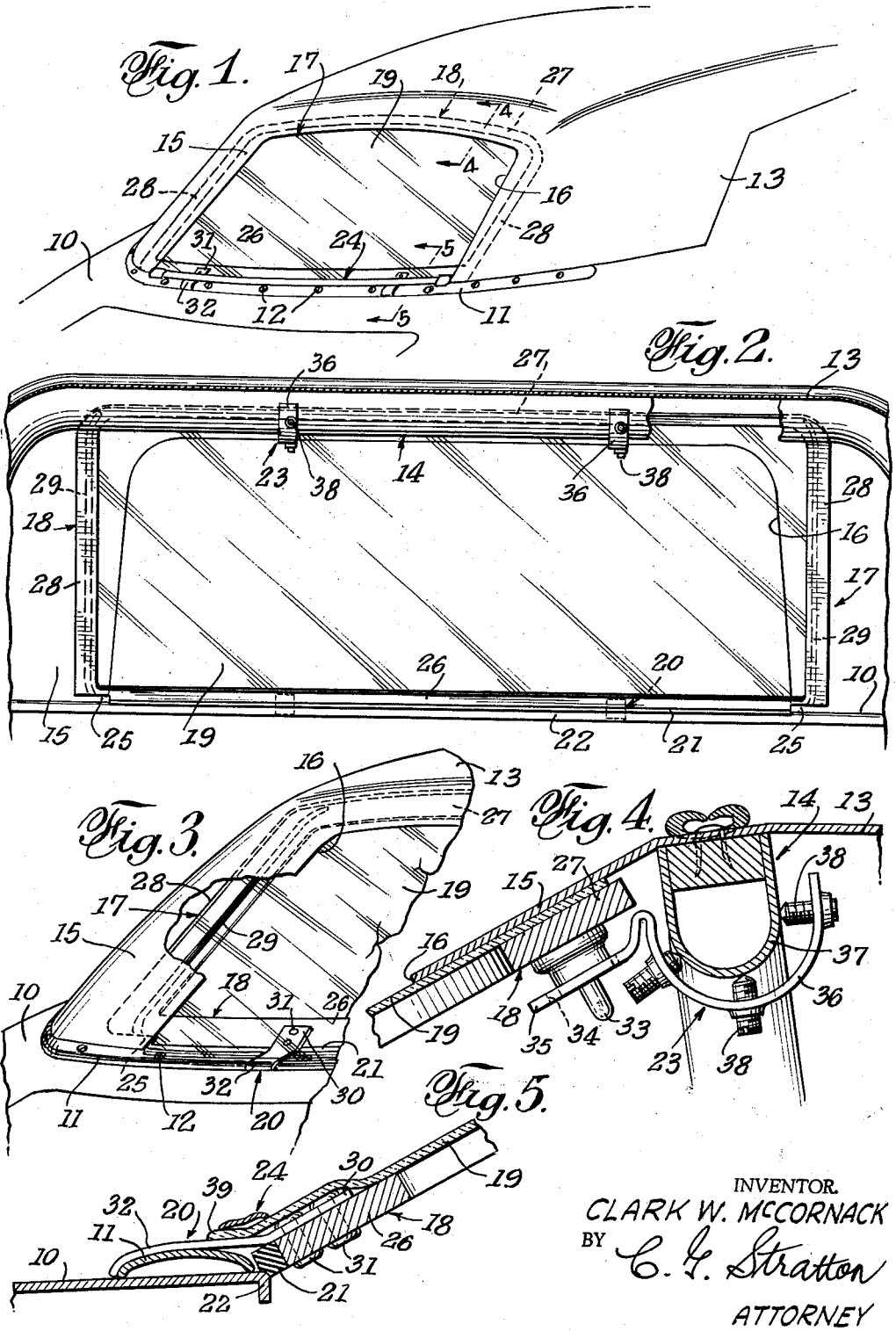
INVENTOR.
CLARK W. McCORNACK
BY
ATTORNEY United States Patent Office 3,191,989
Patented June 29, 1965

3,191,989
CONVERTIBLE-TOP WINDOW STRUCTURE
Clark W. McCornack, 5413 Muscatel Ave.,
San Gabriel, Calif.
Filed Feb. 4, 1963, Ser. No. 255,999
1 Claim. (Cl. 296—145)

This invention relates to a replaceable window construction for the convertible tops of automotive vehicles and has for an object to provide a structure that is adapted for easy and facile installation in the opening from which the original window has been removed.

Since, for various reasons, such windows deteriorate rapidly, becoming cracked, broken and/or losing their initial transparency, one or more replacements, during the life of a convertible auto, of the rear window thereof is required, in the interests of comfort and safety. Heretofore, each window replacements either entailed replacement of the entire convertible top or, at best, special fitting of a new rear window and individual installation on a custom basis and at commensurately high cost.

Another object of the invention is to provide a convertible-top window structure that may be installed without the need for any tools or machines, except a simple screw driver, and without special fitting of the structure to the top opening.

A further object of the invention is to provide a convertible-top window structure that is adapted to be formed as a unit of a size to fit the window openings of different sizes, thereby enabling provision of replacement windows of low cost since but a few different-sized windows need be made available to fit the range of top openings.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a rear perspective view of the present window structure as installed in a convertible top.

FIG. 2 is an enlarged elevational view thereof as seen from within the top and looking rearwardly.

FIG. 3 is a broken rear perspective view of the left-hand portion of the window structure, as installed.

FIGS. 4 and 5 are enlarged detailed, sectional views as taken on the respective lines 4—4 and 5—5 of FIG. 1.

The drawing shows a generally conventional convertible auto, the rear deck 10 of which is provided with a trim molding 11 that serves to carry snap fasteners 12 for the enclosure of the top when folded open. The top 13, usually made of cloth, is fitted with a bow 14 that supports and holds the top firmly taut. The rear wall 15 of the top has an opening 16. For the purposes of this invention, the original window—a thin, pliable, transparent panel—has been removed. It is the opening 15 that is to be closed by the present window structure 17.

Said window structure comprises, generally, a frame 18, a pliable and transparent window panel 19 overlying the rear face of said frame, spring clips 20 affixed to the lower side of the frame and engageable with the trim molding 11, a strip 21 to seal between the lower edge of the frame 18 and the edge 22 defining the forward edge of the deck 10, clamps 23 adjustably carried by the upper portion of the frame 18 and adjustably engageable with the bow 14, and a finish trim 24 over the lower edge portion of the panel 19.

The frame 18 is generally rectangular and of a size larger in both directions than the opening 16. At each lower corner, where said frame overlaps the wall 15 of the top, a relief notch 25 is formed to accomodate adjacent thickened folds of the material from which the top is formed and where the same is joined to the deck edge 22. The lower portion 26 of the frame 18 spans across the opening 16. The upper portion 27 and the side portions 28 of the frame are overlapped by the wall 15 and reside outside the perimeter of said opening 16.

The window panel 19, either by staples or tacks or by heat sealing, is affixed to the frame 18. Said frame may be made of a wide variety of materials, plastics, compositions and metal being examples, depending on whether the panel 19 is heat welded to the frame or otherwise fastened thereto.

Where the window panel 19 overlaps the frame sides 28, a weather-sealing strip 29 may be provided to seal against the inner face of the wall 15. Since the frame 18 and window 19 constitute a flexible unit that is especially adapted to flex to accommodate to the outwardly curved wall 15 when applied from the inside of the top 13 to said wall, the seals 29 are effective to weatherproof around the sides when the portions 26 and 27 of the frame are secured in place, as will be later described.

While two spring clips 20 are shown, one may serve for smaller windows and three or more may be used, if desired. Each said clip has an end 30 fixedly connected by rivets 31 to the lower frame portion 26, preferably beneath the lower edge of the window panel 19 so said panel may shed water, as shown in FIG. 5, and an extension 32 that is formed to engage over the trim molding 11 and to so engage the same as to serve as a hold-down that cooperates with the sealing strip 21 to effect a hold-down attachment of the present window structure 17 to the deck 10.

The clamps 23 may also vary in number, each clamp being adjustably secured to the upper portion 27 of the frame 18, as by a fastener 33 carried by said frame portion and extending through an adjusting slot 34 in an end 35 of the clamp, as shown in FIG. 4. Each clamp 23 is provided with a curved end 36 larger than and adapted to loosely encompass the horizontal portion 37 of the bow 14, and with several set screws 38 carried by said end 35 and directed to impinge on the bow portion 37, as shown. FIG. 4 shows a slightly offset relationship between the bow and the curved end 35 of the clamp, the same indicating that the connection may be adjusted, through the medium of the set screws 38, to insure a nicety of fit between the parts.

It will be clear that, with the clips 20 and clamps 23 in place, the frame 18 and panel 19 will flex, as above mentioned, to conform to the curvature of the rear wall 15, thereby causing the strips 29 to seal effectively.

As shown in FIGS. 1 and 5, the trim 24 may be used to finish off the fit along the lower edge of the structure, especially where the lower edge 39 of the panel 19 spans the opening 16 of the wall 15.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claim.

Having thus described this invention, what is claimed and desired to be secured by Letters Patent is:

A window structure for the opening in the rear wall of the top of a convertible automobile having a support bow, the deck of the automobile being provided with a molding along the forward edge thereof, said structure comprising:

(a) a flexible rectangular unitary frame with a transparent window panel secured thereto and larger in both the height and width dimensions than the comparable dimensions of the opening in the top, and (b) means connected to the upper and lower portions of the frame and engaged with the mentioned bow and deck molding to hold the frame and its window panel in position against the inner side of the rear of said top, (c) said means comprising adjustably-mounted clamps on the upper portion of said frame whereby said clamps may be adjusted to the position of the bow, said clamps being screw engaged with the bow, and spring clips on the lower portion of the frame and in hold-down engagement with the deck molding.

References Cited by the Examiner
UNITED STATES PATENTS

| | | | |
|---|---|---|---|
| 2,495,022 | 1/50 | Robbins | 296—145 |
| 3,091,494 | 5/63 | Cohen | 296—145 |

A. HARRY LEVY, *Primary Examiner.*